United States Patent
Roussarie et al.

(10) Patent No.: US 9,764,432 B2
(45) Date of Patent: Sep. 19, 2017

(54) DEVICE FOR SURFACING A METAL ALLOY PART

(71) Applicant: SNECMA, Paris (FR)

(72) Inventors: Philippe Fabrice Jean-Yves Roussarie, Moissy-Cramayel (FR); Frederique Laurence Machi, Ostwald (FR); Nicolas Haettel, Illkirch (FR); Thibaut Florent Wenger, Niederbronn (FR)

(73) Assignee: SNECMA, Paris (FR)

( * ) Notice: Subject to any disclaimer, the term of this patent is extended or adjusted under 35 U.S.C. 154(b) by 313 days.

(21) Appl. No.: 14/368,228

(22) PCT Filed: Dec. 21, 2012

(86) PCT No.: PCT/FR2012/053040
§ 371 (c)(1),
(2) Date: Jun. 23, 2014

(87) PCT Pub. No.: WO2013/093368
PCT Pub. Date: Jun. 27, 2013

(65) Prior Publication Data
US 2015/0102017 A1 Apr. 16, 2015

(30) Foreign Application Priority Data
Dec. 23, 2011 (FR) ...................... 11 62443

(51) Int. Cl.
*B23K 26/00* (2014.01)
*B23K 37/06* (2006.01)
(Continued)

(52) U.S. Cl.
CPC .............. *B23K 37/06* (2013.01); *B23K 26/32* (2013.01); *B23K 26/342* (2015.10);
(Continued)

(58) Field of Classification Search
CPC ..... B23K 37/06; B23K 26/32; B23K 35/0244; B23K 26/342; B23K 26/702; B23K 2201/001; B23K 2203/50; B23K 2203/08
(Continued)

(56) References Cited

U.S. PATENT DOCUMENTS 6,049,060 A * 4/2000 Smashey ............ B23K 9/0026
219/137 R
2009/0001065 A1* 1/2009 Ladru ................... B23K 37/06
219/137 R

FOREIGN PATENT DOCUMENTS

EP 1 797 985 6/2007
EP 1 961 513 8/2008

OTHER PUBLICATIONS

International Search Report issued for International Application No. PCT/FR2012/053040, dated Apr. 19, 2013.

* cited by examiner

*Primary Examiner* — Thien S Tran
(74) *Attorney, Agent, or Firm* — Pillsbury Winthrop Shaw Pittman LLP

(57) ABSTRACT

A device for surfacing a metal alloy part by laser welding, the part including a recess to be surfaced and located at a planar area of the part, the device including first and second protective elements arranged on either side of the recess, the first and second protective elements each having an irradiation surface which is to be at least partially covered with a layer of powder to enable welding by passing a laser beam over the powder, the laser beam passing over the irradiation surface of the first protective element during welding and then the irradiation surface of the second protective element, the second protective element having a shape for containing a layer of powder having a height that is greater at the end, in the direction of propagation of the laser beam during
(Continued)

welding, of the second protective element than at the start of the second protective element.

9 Claims, 2 Drawing Sheets

(51) Int. Cl.
*B23K 26/32* (2014.01)
*B23K 26/342* (2014.01)
*B23K 26/70* (2014.01)
*B23K 35/02* (2006.01)
B23K 101/00 (2006.01)
B23K 103/00 (2006.01)
B23K 103/10 (2006.01)

(52) U.S. Cl.
CPC ........ *B23K 26/702* (2015.10); *B23K 35/0244* (2013.01); *B23K 2201/001* (2013.01); *B23K 2203/10* (2013.01); *B23K 2203/50* (2015.10)

(58) Field of Classification Search
USPC ..... 219/73.11, 76.14, 76.17, 121.64, 121.84, 219/121.85, 137 R
See application file for complete search history.

DEVICE FOR SURFACING A METAL ALLOY PART

CROSS REFERENCE TO RELATED APPLICATIONS

This application is the U.S. National Stage of PCT/FR2012/053040, filed Dec. 21, 2012, which in turn claims priority to French Patent Application No. 1162443 filed Dec. 23, 2011, the entire contents of which is incorporated herein by reference in its entirety.

TECHNICAL FIELD OF THE INVENTION

The invention relates to a device for surfacing a metal alloy part; the alloy under consideration in the present document takes the form of an alloy of aluminium, solely by way of an example, and the device according to the invention can relate to other types of metal alloy.

Generally the surfacing of a part involves adding material (in the form of powder or of frits etc.) to locations where the part has fissures (or cracks) and/or recesses. Welding or brazing techniques are most often used to do this.

The method of the invention can be used, in particular, for surfacing of a part of a turbine engine (for example of the turbo-jet, turboprop, ground-based gas turbine type etc.), and more particularly, a turbojet fan casing.

Turbojet fan casings are most often made from an aluminium alloy and undergo damage during their manufacture (tooling impacts) or during operation of the turbojet (ingestion of pebbles or other projectiles which strike the casing). In general, it is difficult to surface these casings by welding as the aluminium alloys used have a fairly limited weldability, since these alloys have very high thermal conductivity and high reflectivity.

One of the known methods is that of surfacing using T.I.G. (or Tungsten Inert Gas) welding. This method nevertheless possesses drawbacks: the heat affected zone of the part due to welding is too extensive and exhibits significant deformation. In addition, before surfacing can be carried out it is necessary to remove the fan casing in order to separate it from the rest of the low-pressure compressor module (also called the fan and booster module) of the turbojet engine, since the electric arc generated during T.I.G. welding would damage the bearings that are still assembled.

TECHNOLOGICAL BACKGROUND TO THE INVENTION

As an alternative to surfacing using TIG welding, a solution has been proposed allowing a part to be surfaced by welding which induces a restricted heat affected zone, with low levels of deformation and which furthermore can be used to surface a turbojet fan casing without it being necessary to dismantle the casing.

Such a solution essentially comprises two main steps for the surfacing, by welding, of a part made of aluminium alloy; the steps are as follows:
  a layer of aluminium alloy powder is deposited manually on the part, in a surfacing zone; and
  said layer of powder is welded onto said part by laser welding.

It has in effect been observed that the laser welding carried out induced a heat affected zone and deformation which are less than those induced by T.I.G welding.

Furthermore, due the manual deposition of the powder, the equipment required to implement such a method is small in size. This allows the part that is to be surfaced to be easily accessed, even when the latter is assembled on other parts. More particularly, this allows the fan case of a turbojet to be easily accessed whilst it is still incorporated in the compressor module. Advantageously, surfacing of the fan housing is therefore carried out without the latter being dismantled from the rest of the turbojet compressor module, which allows valuable time to be saved. In addition, since there is no electric arc generated by laser welding, there is no risk of damaging the bearings.

Such a known state of the art method is recalled with reference to the FIGS. 1 to 5, whose description follows.

In these figures, a part 1, shown in section in FIG. 1, has a recess 3 in the form of a cup, where said recess has to be filled. The part 1 is, for example, a fan casing for a double-body, double-flow turbojet and belongs to the low pressure compressor module for the turbojet which comprises, in addition, the fan and the low pressure compressor (or booster).

The surfacing zone 5 of the part 1 relates to the area of the recess 3. In addition, when reference is made to the surface of the part, this is intended to designate the general surface S of this part. In the surfacing zone 5, the surface S does not therefore correspond to the bottom of the recess 3 but to the surface S of the part when it did not possess the recess 3, as shown in broken lines in FIG. 1.

A layer 8 of aluminium alloy powder 9 is deposited manually on the part 1, in the surfacing zone 5.

In practice, in order to obtain the layer 8, this can be carried out by successive depositions of at least two sub-layers 11a, 11b each formed of several beads of powder 9 which are parallel and spaced apart in steps P.

For example, in order to surface the part 1, the first sub-layer 11a formed of beads 12a spaced a distance P apart is deposited, and then the second sub-layer 11b formed of beads 12b spaced the same distance P apart is deposited, but offset by a distance P/2 in relation to the beads 12a.

The juxtaposition of sub-layers made of beads of powder 9 means that a well densified layer 8 with a relatively constant thickness can be obtained.

Thus the height of the layer 8 of powder is calibrated relative to the surface S of the part 1. In this way the thickness of the layer 8 to be deposited can be controlled, with this thickness having an influence on the quality of the laser welding carried out. In effect, if this thickness is too small, a lack of material at the surface would result.

This calibration step naturally takes place after the step for deposition of the layer of powder and before the laser welding step. In order to carry out this calibration step, a scraper is advantageously used, comprising at least one support foot that is made to rest on the surface S of said part, and a scraper blade located further back in relation to the support foot so that the distance between this scraper blade and the surface of said part corresponds to the desired height for the layer of powder 8.

After depositing the layer 8 and having advantageously calibrated the height of the latter, the laser welding step is carried out.

For this step, for example, a diode laser 40 as can be seen in FIG. 3 is used, which offers a more regular beam/material interaction than a Y.A.G. (Yttrium Aluminium Garnet) type laser The laser beam 41 emitted then travels over the surfacing zone 5, as shown in FIG. 4. The energy provided by the beam 41 causes the powder 9 and the adjacent portions of the part 1 to fuse and form a pool and to mix. After cooling, the desired surfacing is obtained.

According to one mode of implementation, in order to restore the aerodynamic properties of the part 1 then after the welding step the part 1 is leveled off by machining of the part in the surfacing zone 5, since the surface of the part 1 in this zone is generally not perfectly flat after welding. FIG. 4 shows the finished part obtained after the machining step.

Advantageously, as shown in FIG. 5, the use of covers, or sacrificial pieces, is envisaged which are made for example of an aluminium alloy sheet or more generally of an alloy of the same nature as the material to be surfaced. In FIG. 5, a first cover 51 and a second cover 52 are used, arranged on either side of the recess 3. The layer 8 of aluminium alloy powder is deposited in the surfacing zone 5, overflowing onto the covers 51 and 52 to create overflow zones which are not shown. The scraping of the layer 8 and the laser welding is then carried out, along the direction of propagation of the laser beam, in a manner analogous to the scraping and laser welding operations that have just been described.

In the method in FIGS. 2 to 4, the periphery of the layer of powder 8 substantially corresponds to that of the surfacing zone 5, and the interaction between the laser beam 41 and the part 1 in the transition zone between the surfacing zone 5 and the remainder of the part 1 can create micro-fissures. Such micro-fissures are a nuisance insofar as they are located at the closest edge of the surfacing zone 5, or even in the surfacing zone 5, and could weaken the latter. By making the layer 8 of powder overflow onto the covers 51 and 52, the periphery of the layer 8 is offset to outside the periphery of the surfacing zone 5. If micro-fissures are created during welding, they are located at the periphery of the overflow zones and are thus sufficiently far away from the surfacing zone 5 not to weaken the latter.

After the welding step, the covers and the powder 9 of the overflow zones which is then welded to the covers are removed. On the part 1, welded powder only remains in the surfacing zone. If necessary the part can then be leveled off by machining the part in the surfacing zone 5.

However, although this technique is particularly effective with part of small size, for example flat test pieces, the results are poorer for parts of larger size, such as casings and shells. In effect, for parts of larger size cracks are seen to appear, despite the presence of the covers, at the furthest ends of the beads; that is, at the ends which the laser beam reaches last. The presence of such cracks can be explained in particular by the fact that the pool caused by the passage of the laser rapidly heats the furthest ends of the beads, and the temperature difference between these beads and the part 1, even if located beneath the cover 52, is therefore maintained for a long period, which causes the cracks mentioned to appear. Besides, thermal pumping in large sized parts, such as casings, is greater than for parts of small size. Thermal gradients are then generated in the part, which initiates the appearance of cracks.

GENERAL DESCRIPTION OF THE INVENTION

The subject of the invention offers a solution to the problems that have just been described, by proposing a device which ensures that the liquid pool, which is hot, obtained during laser welding is kept at a distance at the end of the bead, away from the part to be surfaced, which remains relatively cold. To this end the device according to the invention proposes the use of a protective element which can be used to raise the beads obtained by welding, over the end of the welding operation, so that they are no longer in contact with the part to be surfaced. This means that the fissures that may appear are located to the exterior of the part.

The invention thus essentially relates to a device for surfacing of a metal alloy part by laser welding, said part comprising a recess to be surfaced, said recess being located at an overall planar area of the part, characterised in that the surfacing device comprises a first protective element and a second protective element, the first protective element and the second protective element being arranged on either side of the recess, the first protective element and the second protective element each having an exposure surface which is to be at least partially covered with a layer of powder in order to enable welding by passing a laser beam over said layer of powder, the laser beam passing over the exposure surface of the first protective element during welding and then the exposure surface of the second protective element, the second protective element having a shape capable of containing a layer of powder having a height that is greater at the end, in the direction of propagation of the laser beam during welding, of the second protective element than a height at the start of the second protective element.

Besides the main characteristics which have just been stated in the preceding paragraph, the device according to the invention may exhibit one or more additional characteristics from amongst the following, considered individually or according to the technically possible combinations:

- the second protective element has a first inclined side wall, a second inclined side wall parallel to the first inclined side wall, the height of the first inclined side wall and of the second inclined side wall increasing in the direction of propagation of the laser beam;
- each inclined side wall of the second protective element has an inclined notch suitable for receiving a plate, said plate having a face which makes up the exposure surface of the second protective element which is to be covered by the layer of powder;
- the plate has an angle of inclination between fifteen degrees and twenty degrees relative to the plane of the globally planar zone which exhibits the recess;
- the inclined side walls of the second protective element have a height which is at least one centimeter higher than the height of the plate;
- each inclined side wall of the second protective element is extended by a flat foot, which rests during laser welding on the metal alloy part, with one free end of each of said feet resting against the first protective element;
- the flat feet have a thickness of between 0.5 millimeters and 1 millimeter, in particular a thickness of between 0.7 millimeters and 0.8 millimeters;
- the second protective element is placed against a positioning spacer held on the part comprising the recess to be surfaced;
- the first protective element and the second protective element are made from an alloy of the same nature as the material to be surfaced.

The invention and its various applications will be better understood on reading the following description and on examination of the figures which accompany it, as an example of an embodiment.

BRIEF DESCRIPTION OF DRAWINGS

The figures are only given for indication purposes and are in no way intended to limit the invention.

DETAILED DESCRIPTION OF AT LEAST ONE EMBODIMENT OF THE INVENTION

Unless otherwise stated, the elements that appear in the various figures retain the same reference.

Figure 1:
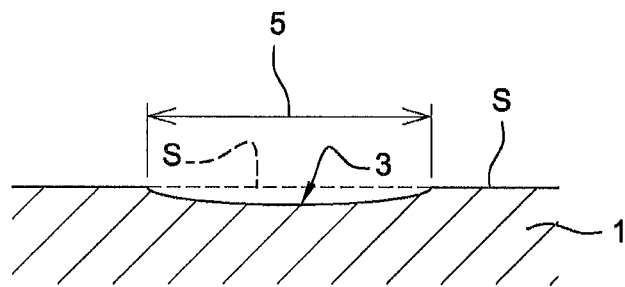
FIG. 1, already described, schematically shows in section an example of a part to be resurfaced.
Figure 2:
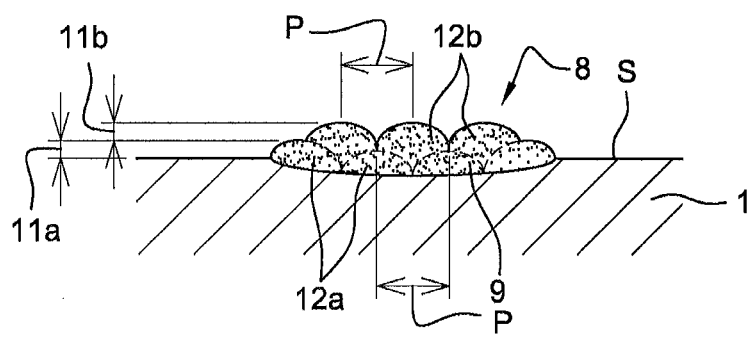
FIGS. 2 to 4, also already described, schematically show various steps of an example of a state of the art process for surfacing of a part made of alloy.
Figure 3:
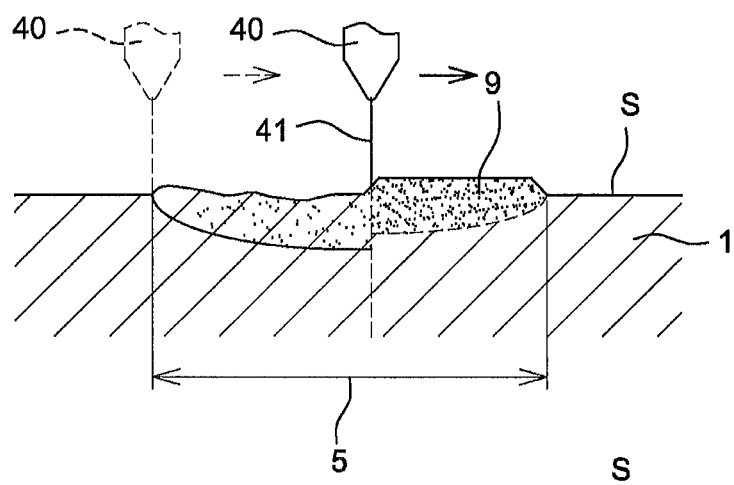
Figure 4:
Figure 5:
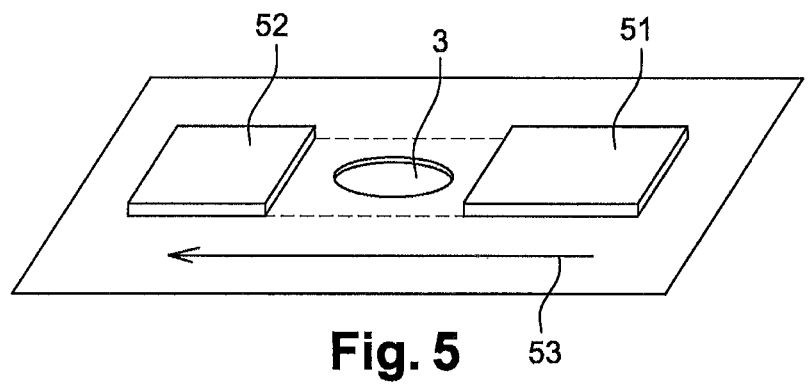
FIG. 5, also already described, shows a schematic representation of a device suitable to be used in an example of a state of the art method for surfacing of an alloy part.
Figure 6:
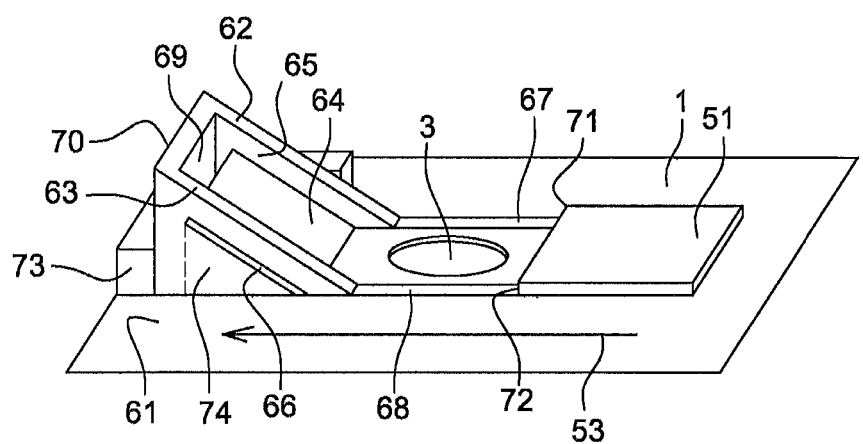
FIG. 6 shows an example of a device according to the invention for surfacing of a metal alloy part.

In FIG. 6, the same elements can be seen as those in FIG. 5, except for the second cover 52 which is replaced by a second protective element 61, the first protective element being formed by the cover 51.

According to the invention, the first protective element 51 and the second protective element 61 are arranged on either side of the recess 3; the second protective element has the shape of a ramp, and hereafter will be thus designated—that is to say, that it is formed by half of a rectangular parallelepiped; it thus has a first inclined side wall 62, a second inclined side wall 63 parallel to the first inclined side wall 62, with the height of the first inclined side wall 62 and of the second inclined side wall 63 increasing in the direction 53 of propagation of the laser beam. The ramp 61 in addition exhibits a closure wall 70 which serves to support the inclined side walls 62 and 63.

Thus an internal volume 69 of the ramp 61 can be filled with powder so that it can subsequently be passed under the laser. By filling the internal volume 69 with powder, and by passing the laser over the powder thus deposited, only the surface layer of the powder is fused; thus the significant source of heat is progressively moved away from the part 1, and the risk of cracks appearing at the end of the beads is thus removed.

In order to minimise the amount of powder consumed, it is proposed to insert a plate 64, itself inclined once positioned into the notches 65 and 66, into a first notch 65 and into a second notch 66, made respectively in the first inclined side wall 62 and in the second inclined side wall 64, in order to make an angle relative to the part 1 of between 15 and 20 degrees. An entire volume 74 located beneath the plate 64 thus remains empty, since it not filled with powder, which represents substantial savings in terms of the amount of powder consumed. Advantageously, it is envisaged that at least one centimeter is left between the top of the inclined side walls 62 and 63 and the plate 64, in order to have a sufficient thickness of powder available to preserve the plate 64 during fusion of the powder, since only a surface layer of the powder undergoes fusion.

In the example described, each inclined side wall 62 and 63 of the ramp 61 is extended by a flat foot 67 and 68, which rests during laser welding on the metal alloy part 1, with one free end 71 and 72 of each of said feet and 68 resting against the first protective element 51. The flat feet 67 and 68 advantageously have a thickness of between 0.5 millimeters and 1 millimeter, notably a thickness of between 0.7 millimeters and 0.8 millimeters, which corresponds to the thickness of the powder to be spread before the laser beam is passed.

The protective elements 51 and 61 are removable. Once a pass of the laser beam is completed, they may be removed in order to clean the part, in particular of remaining powder. The ramp 61 may then, if a second pass of the laser beam is necessary, be easily replaced onto part 1 by positioning it against a positioning spacer 73 which is held on the part 1 by any fastening means.

Thus thanks to the device according to the invention, an effective method for surfacing using welding can be implemented, where the liquid pool produced during the passage of the laser beam is at a distance from the part to be surfaced. Any cracks are then generated in the excess thickness of powder located on the ramp 61, outside the part 1; the powder fused on the ramp is then easily eliminated during a machining operation.

The invention claimed is:

1. A device for surfacing of a metal alloy part by laser welding, said part comprising a recess to be surfaced, said recess being located at an overall planar area of the part, the surfacing device comprising a first protective element and a second protective element, the first protective element and the second protective element being arranged on either side of the recess, the first protective element and the second protective element each having an exposure surface which is to be at least partially covered with a layer of powder in order to enable welding by passing a laser beam over said layer of powder, the laser beam passing over the exposure surface of the first protective element during welding and then the exposure surface of the second protective element, the second protective element having a shape capable of containing a layer of powder having a height that is greater at an end, in a direction of propagation of the laser beam during welding, of the second protective element than a height at a start of the second protective element, the second protective element having a first inclined side wall, a second inclined side wall parallel to the first inclined side wall, the height of the first inclined side wall and of the second inclined side wall increasing in the direction of propagation of the laser beam, wherein the first and second inclined side walls define between them an internal volume of the second protective element for containing the layer of powder.

2. The device according to claim 1, wherein each inclined side wall of the second protective element has an inclined notch suitable for receiving a plate, said plate having a face which makes up the exposure surface of the second protective element which is to be covered by the layer of powder.

3. The device according to claim 2, wherein the plate has an angle of inclination between fifteen degrees and twenty degrees relative to a plane of the globally planar zone exhibiting the recess.

4. The device according to claim 2, wherein the inclined side walls of the second protective element have a height at least one centimeter greater than a height of the plate.

5. The device according to claim 1, wherein each inclined side wall of the second protective element is extended by a flat foot which rests during laser welding on the metal alloy part, with one free end of each of said feet resting against the first protective element.

6. The device according to claim 5, wherein the flat feet have a thickness of between 0.5 millimeters and 1 millimeter.

7. The device according to claim 1, wherein the second protective element is placed against a positioning spacer held on the part comprising the recess to be surfaced.

8. The device according to claim 1, wherein the first protective element and the second protective element are made from an alloy of a same nature as the material to be surfaced.

9. The device according to claim 6, wherein the flat feet have a thickness of between 0.7 millimeters and 0.8 millimeter.

* * * * *